H. T. YARYAN.
Apparatus for Separating Volatile Oils or Solvents from Fixed Oils.
No. 238,543.  Patented March 8, 1881.
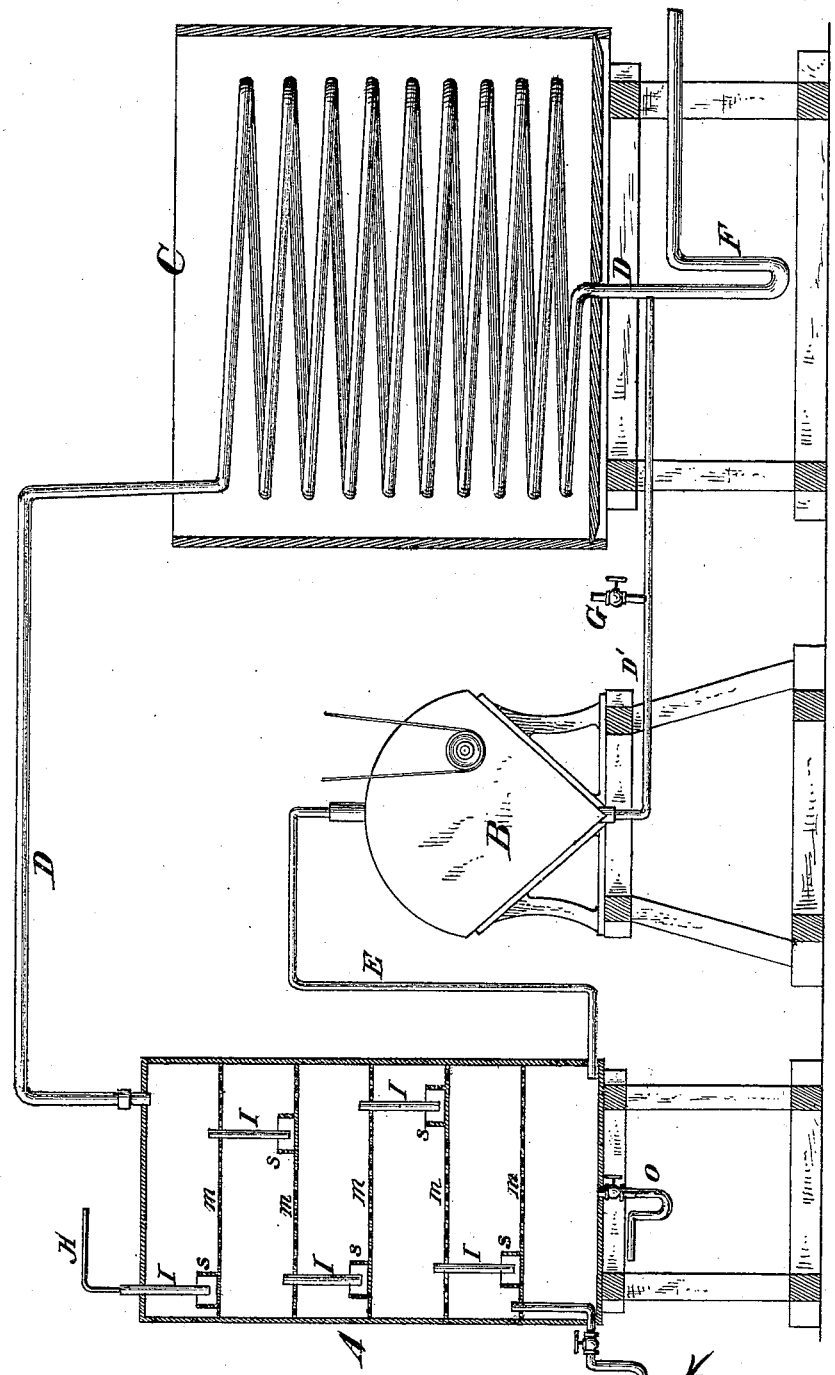

UNITED STATES PATENT OFFICE.

HOMER T. YARYAN, OF RICHMOND, INDIANA.

APPARATUS FOR SEPARATING VOLATILE OILS OR SOLVENTS FROM FIXED OILS.

SPECIFICATION forming part of Letters Patent No. 238,543, dated March 8, 1881.

Application filed February 24, 1880.

*To all whom it may concern:*

Be it known that I, HOMER T. YARYAN, a citizen of the United States, residing at Richmond, in the county of Wayne and State of Indiana, have invented certain new and useful Improvements in Apparatus for Separating Volatile Oils or Solvents from Fixed Oils; and I do hereby declare that the following is a full, clear, and exact description of the invention, which will enable others skilled in the art to which it appertains to make and use the same.

My invention is specially designed for the separation of the volatile solvent (usually employed to extract oil from various seeds) from the extracted oil.

The object of my invention is to thoroughly purify the oil from the residual solvent; to make the operation continuous and more uniform, and prevent the injury resulting from exposing it to the danger of oxidation.

To this end my invention consists in an apparatus for the continuous purification of oil, consisting, essentiallly, of the purifying vessel or column having perforated partitions, and cups with imperforate bottoms, pipes having their lower ends extended into the cups, and their upper ends passed through the partitions above the cups, a blower, a condenser, and pipe-connections, all as hereinafter more fully described.

To enable others skilled in the art to which it appertains to practice my invention, I will describe the process in connection with the apparatus illustrated in the accompanying drawing, showing an aerating column, A, and condenser C in vertical section with their connecting parts.

The column A is similar in form and general construction to a redistilling-column divided by a number of horizontal partitions, $m$, constituting floors to the various chambers thus formed. The floors $m$ are formed of sheet metal containing a large number of minute perforations uniformly distributed over their area, or may be composed of a wire-netting finely meshed. Open-ended pipes I pass through the floors $m$, their upper ends standing a short distance above the floors and the lower ends projecting downward to near the subjacent floors, where they rest in cups S. This construction allows only the overflow of oil to pass downward, and the liquid in the cups forms a seal for the lower ends of the tubes I, to prevent any air passing back through them. The bottom of the column is not perforated, excepting for the admission of a discharge-pipe, O, which is provided with an exterior U-trap. From the lowest perforated floor $m$ a discharge-pipe, $n$, leads out to the final receptacle of the purified oil. The receiving-mouth of the pipe $n$ stands at the same distance above the floor as the other pipes, $m$, and it has also an exterior U-trap. A blower, B, of any approved kind, delivers air beneath the lowest perforated floor by a pipe, E. It draws its supply from the upper chamber of the column A by a pipe, D D', which passes through a condenser, C, in which it is coiled and surrounded by water at a low temperature. The pipe D divides after emerging from the bottom of the condenser C, the part F being provided with a U-trap, and leading thence to a receptacle for solvent, while the part D' forms the connection with the blower. A valve, G, opening from pipe D' into the outer air, furnishes the means of admitting additional air when necessary. Suitable stop-cocks in the line of pipes control the passages and regulate the flow.

The operation is as follows: The oil containing the residual solvent is admitted to the column, at an elevated temperature, through the pipe H, and the blower is at the same time started in operation. The U-traps in pipes O, $n$, and F are partly filled with liquid from previous operation, or the apertures are closed by stop-cocks. The oil distributes itself over the upper floor, $m$, being prevented from passing through the meshes by the pressure of air below, the force of the air-blast being regulated by the attendant to the strength required. As soon, however, as the oil reaches the level of the overflow-pipe I, it overflows into the next chamber below, and so from chamber to chamber, being prevented from passing through the perforated floors by the column of air which is continually passing upward in a finely-divided state through the shallow layers of oil, and the oil on reaching the lowest perforated floor overflows into and through the pipe $n$ to the final receptacle. The air in passing upward through the successive layers of oil absorbs the naphtha or other solvent, which it carries over into the condenser C. Here the temperature of the air is so far reduced as to condense the solvent, which passes out through the pipe F and is collected in a suitable receiver, while the purified air is drawn again in the blower and returned to the colum, thus maintaining a continuous circuit.

Should any stoppage or diminution of the air-blast occur, so as to allow the oil to pass through the perforations of the floors, it falls upon the bottom of the column and passes out through the pipe O, whence it may be returned to the column, as before.

It will be readily understood that the flow of oil through the column may thus be continuous as long as the blower is in operation, and the purifying process go on indefinitely without exposure to the outer atmosphere, and inasmuch as the same air is thus used over and over, the danger of oxidizing the oil is thus practically obviated.

The operation may be repeated, if necessary, in another column with fresh air, in order to effect an absolutely perfect separation. The vent-cock G is left somewhat open during the process, to allow for the expansion of the air under varying temperature.

I am aware of United States Patent No. 60,166 for an apparatus for distilling and refining oils, wines, and other liquids, and I do not therefore claim the apparatus therein shown.

Having described my invention, I claim and desire to secure by Letters Patent—

The apparatus for the continuous purification of oil, consisting, essentially, of the purifying vessel or column A, having perforated partitions m, and cups S, with imperforate bottoms, and pipes I, the blower B, condenser C, and pipe-connections, substantially as specified.

In testimony whereof I have hereunto set my hand in the presence of two subscribing witnesses, this 10th day of February, 1880.

HOMER T. YARYAN.

Witnesses:
T. FRANK ALDRICH,
JOSEPH BEE.